United States Patent
Gundtoft et al.

(10) Patent No.: US 9,653,955 B2
(45) Date of Patent: May 16, 2017

(54) STATOR ARRANGEMENT

(75) Inventors: Soeren Gundtoft, Fredericia (DK); Jean Le Besnerais, Mons en Baroeul (FR); Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 830 days.

(21) Appl. No.: 13/467,131

(22) Filed: May 9, 2012

(65) Prior Publication Data
US 2012/0286597 A1    Nov. 15, 2012

(30) Foreign Application Priority Data
May 12, 2011  (EP) .................................... 11165853

(51) Int. Cl.
*H02K 9/19* (2006.01)
*H02K 3/24* (2006.01)
*H02K 7/18* (2006.01)

(52) U.S. Cl.
CPC .............. *H02K 3/24* (2013.01); *H02K 7/183* (2013.01); *H02K 7/1838* (2013.01); *H02K 9/19* (2013.01); *Y02E 10/725* (2013.01)

(58) Field of Classification Search
USPC .................................... 310/52, 54, 59, 60 A
See application file for complete search history.

(56) References Cited

U.S. PATENT DOCUMENTS

| | | | |
|---|---|---|---|
| 3,681,628 A * | 8/1972 | Krastchew | 310/54 |
| 2007/0103027 A1* | 5/2007 | Jansen et al. | 310/266 |
| 2008/0030081 A1* | 2/2008 | Yamaoka et al. | 310/12 |
| 2011/0221288 A1* | 9/2011 | de Bock et al. | 310/59 |
| 2012/0112572 A1* | 5/2012 | Le Besnerais et al. | 310/58 |

FOREIGN PATENT DOCUMENTS

| | | |
|---|---|---|
| CN | 1327627 A | 12/2001 |
| CN | 101728897 A | 6/2010 |
| DE | 19950418 A1 | 4/2001 |
| EP | 1156579 A1 | 11/2001 |
| WO | WO 2004001949 A1 | 12/2003 |

OTHER PUBLICATIONS

Communication From European Patent Office, Mar. 21, 2012, pp. 1-6.

* cited by examiner

*Primary Examiner* — Terrance Kenerly

(57) ABSTRACT

A stator arrangement for an electric machine is provided. The stator arrangement includes a stator having a stator yoke with a number of stator slots, with each stator slot accommodating at least one set of stator windings and at least one cooling device in the shape of a duct-like pipe. The duct-like pipe is divided in two or more separate cooling channels.

17 Claims, 2 Drawing Sheets

STATOR ARRANGEMENT

CROSS REFERENCE TO RELATED APPLICATIONS

This application claims priority of European Patent Office application No. 11165853.0 EP filed May 12, 2011. All of the applications are incorporated by reference herein in their entirety.

FIELD OF INVENTION

The invention refers to a stator arrangement for an electric machine, comprising a stator having a stator yoke with a number of stator slots, with each stator slot accommodating at least one set of stator windings and at least one cooling means in the shape of a duct-like pipe.

BACKGROUND OF INVENTION

It is known that the operation of electrical machines such as generators or the like having a stator arrangement, comprising a stator having a stator yoke with a number of stator slots, with each stator slot accommodating at least one set of stator windings, and a rotor being rotatable relative to the stator is accompanied by heat losses or copper losses respectively.

In order to avoid thermal overheating which would lead to lowered efficiency or even to damage or a reduction of the lifetime, particularly the insulation lifetime of the electrical machine, usually cooling means are provided with the stator arrangement.

EP 1 499 001 A1 discloses a device for cooling an electrical machine comprising a stator in which successive recesses are provided in a circumferential direction. The recesses contain at least one winding and open out on an inlet face of the stator. Thereby, at least one cooling tube extending in the longitudinal direction of the recess is disposed in each of the stator recesses. The at least one cooling tube is located in the inlet portion of the recess closest to the air gap.

Yet, the cooling efficiency of known cooling means is often times not satisfying.

SUMMARY OF INVENTION

Hence, it is the object of the present invention to provide a stator arrangement having an improved cooling capability.

This is achieved by a stator arrangement as has been initially described, wherein the duct-like pipe is divided in two or more separate cooling channels.

The present invention is based on the finding to divide a cooling means in the shape of a duct-like pipe in respective separate cooling channels. In such a manner, the cooling capability of the cooling means may be increased since the inventive duct-like pipe has an increased heat exchange surface in comparison to the duct-like pipes known from prior art.

Likewise, the volume of the cooling fluid flowing through the duct-like pipe or the respective cooling channels respectively is divided in respective sub-volumes corresponding to the respective cooling channels within the duct-like pipe. In such a manner, the cross-section of the duct-like pipe comprises respective separate cooling cavities each being defined by the respective walls of the respective cooling channels. Thereby, thermal exchange between the respective sub-volumes of the cooling fluid flowing through the respective cooling channels is essentially diminished which leads to an increase of the cooling efficiency of the cooling means as a whole.

An improved cooling capacity of the cooling means is further achieved in that the cooling means, i. e. the duct-like pipe with the respective cooling channels may be placed as close as possible to the heating source within the respective stator slots, i. e. in particular the set of stator windings. Thereby, the radial position of the duct-like pipe may vary, i. e. the duct-like pipe may take radially inner (bottom) or outer (top) positions within the stator slot with respect to a centre axis of the stator. The duct-like pipe may also be disposed in an intermediate position in between two or more adjacently disposed sets of stator windings.

The number of the respective cooling channels within the duct-like pipe is at least two. Yet, higher numbers are possible as well, whereby the number of the respective cooling channels will mainly bee defined by the dimensions, in particular the cross-section of the duct-like pipe and the dimensions, in particular the cross-section of the respective cooling channels. The duct-like pipe preferably comprises symmetrically disposed cooling channels.

In an exemplary embodiment, the duct-like pipe comprises four symmetrically disposed cooling channels. It is understood that the respective cooling channels may be disposed in horizontal and/or vertical direction, i. e. circumferential and/or radial direction with respect to the centre axis of the stator.

According to exemplary embodiments of the invention, the duct-like pipe may comprise four cooling channels being disposed in one or more rows on top of each other, whereby each row comprises at least one cooling channel.

Besides, the respective cooling channels may also be non-uniformly distributed, i. e. a first row may comprise only one cooling channel, whereas a second row may comprise three cooling channels.

Arbitrary variations of disposing the respective cooling channels within the duct-like pipe are possible.

With the duct-like pipe being divided in respective cooling channels an individual control of the cooling properties of the cooling means as a whole is possible. This is due to the fact that the cooling capability of each respective cooling channel may be individually controlled by a respective cooling system being preferably separately connected to the respective cooling channels. That is, all respective cooling parameters like flow rate, pressure, temperature, composition, etc. of a cooling fluid running through the respective cooling channels may vary for each cooling channel.

Of course it is possible that the inventive stator arrangement, i. e. the respective stator slots comprises more than one respective duct-like pipe.

The inventive duct-like pipes may be allocated to at least one set of stator winding having a given electrical phase. That is, the duct-like pipes may be allocated to only one set of stator windings with a given electrical phase or at least two sets of stator windings with a given electrical phase, respectively. Of course, it is also possible that the duct-like pipe follows more than one set of stator windings as well.

The respective cooling channels may have the same or, if need be in groups, different cross-sections in shape and/or area and/or different length. The same applies to all other geometrical or constructive features of the respective cooling channels. In such a manner, arbitrary embodiments of like or differently shaped cooling channels are thinkable.

For the exemplary embodiment of a duct-like pipe being divided in four respective cooling channels it is possible, that all cooling channels are equally shaped, i.e. have the same cross-section in shape and area. Yet, it is also possible that the four cooling channels are divided in two groups, whereby the respective cooling channels allocated to the respective groups differ in cross-sectional shape and/or area, i.e. the cooling channels allocated to a first group have a first cross-sectional shape and/or area, whereas the cooling channels allocated to a second group have a second cross-sectional shape and/or area. Of course a division of the four respective cooling channels in a 3:1 configuration is also thinkable, whereby three cooling channels are equally shaped with a first cross-sectional shape and/or area and the remaining cooling channel is shaped in a second cross-sectional shape and/or area. The foregoing also applies to the respective lengths of the cooling channels as well as duct-like pipes with any number of cooling channels.

It is thinkable that the duct-like pipe and/or at least one cooling channel has a rectangular cross-section. Yet, other cross-sectional shapes are possible as well. It is also thinkable that the cross-sectional shape of the duct-like pipe and/or the cooling channels differs along its respective length. As a rule, the cross-section of the at least two cooling channels is adapted to the cross-section of the duct-like pipe enfolding the at least two cooling channels.

It is preferred that the at least two cooling channels are integrally built with the duct-like pipe. Hence, the manufacturing process of the duct-like pipe and the respective cooling channels is highly integrated since the cooling channels may be formed in one step together with the duct-like pipe.

Of course, it is also thinkable that the at least two cooling channels and the duct-like pipe are provided as separate parts. In this case, the respective cooling channels may be inserted and firmly fixed, i. e. welded, glued, braced, etc. within the duct-like pipe in appropriate manner.

Regarding the material of the duct-like pipe, it is of advantage when the duct-like pipe comprises an aluminium profile. First, aluminium comprises good thermal properties, i. e. has a comparatively high coefficient of thermal conductivity which leads to good cooling behaviour. Second, since aluminium is an extrudable material, the manufacturing process of the duct-like pipe in particular in regard of an integral manufacture of the duct-like pipe together with the respective cooling channels is simple and fast. That is, the duct-like pipe may be manufactured in a so called multi port extrusion process leading to large internal surface areas, yielding in more efficient heat transfer behaviour. Aside, also surface structures such as turbulators or the like may be integrated in the cooling channels. Third, since aluminium shows a ductile material behaviour the duct-like pipe may easily be formed in diverse diametrical shapes. Thereby, even comparatively sharp bending radii may be realised. Fourth, the use of aluminium allows a more lightweight construction of the duct-like pipe in particular in comparison to the commonly used copper. Though aluminium shows a number of advantages, in exceptional cases other materials having good thermal properties, i. e. particularly a high thermal conductivity may also be used.

The inlet and outlet of the duct-like pipe and/or the at least two cooling channels may be supposed on the same face side of the stator yoke. In such a manner, both inlets and outlets are easily accessible which offers advantages in terms of connecting the duct-like pipe to a cooling system like a cooling inlet and/or outlet manifold for instance. Besides, service and repair are easily executable.

It is advisable when the course of the at least one cooling means at least partially, particularly entirely follows the course of the at least one set of stator windings. With the shape of the respective set of stator windings and the shape of the duct-like pipe being essentially the same, the contact area between the respective duct-like pipe and the respective set of stator windings may be enhanced and thus, the cooling performance may be improved. Thereby, especially the area of the ends of the respective stator windings, i. e. the end or overhang windings is provided with sufficient cooling.

As a cooling fluid preferably an electrically non-conductive cooling fluid, particularly oil, flowing through the at least two cooling channels is used. Due to the electrical insulating behaviour of the cooling fluid induced electrical currents of high magnitude may be avoided.

The stator may be segmented in at least two stator segments adapted to build the stator. Thus, the stator may comprise several stator segments leading to advantages regarding handling, transport, service and maintenance of the stator arrangement as a whole.

Besides, the invention relates to an electric machine comprising a stator arrangement as described before. The electric machine is preferably used as a generator for a wind turbine, especially a direct drive wind turbine.

BRIEF DESCRIPTION OF THE DRAWINGS

In the following, the invention is described in detail as reference is made to the figures, whereby.

DETAILED DESCRIPTION OF INVENTION

Figure 1:
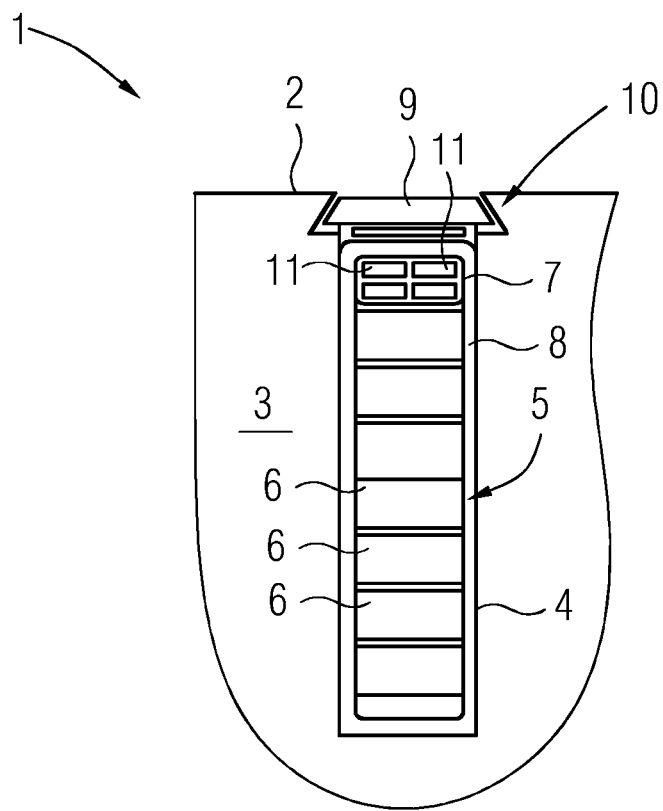
FIG. 1 shows a principle cut-out view of a stator arrangement according to an exemplary embodiment of the invention.

FIG. 1 shows a principle cut-out view of a stator arrangement 1 according to an exemplary embodiment of the invention. The stator arrangement 1 is part of an electric machine (not shown) in the shape of a generator. The generator is preferably part of a direct drive wind turbine (not shown).

The stator arrangement 1 comprises a stator 2 having a stator yoke 3 with a number of radially extending stator slots 4. The stator slots 4 are circumferentially disposed along the stator yoke 3. Each stator slot 4 accommodates at least one set of stator windings 5 consisting of a number of strand-like stator windings 6. Additionally, each stator slot 4 accommodates a cooling means in the shape of a duct-like pipe 7. The duct-like pipe 7 may be placed in a top, bottom or intermediate position within the stator slot 4.

Both the respective sets of stator windings 5 as well as the duct-like pipe 7 are encased by a sleeve-like insulation layer 8 of an electrically insulating material. In known manner, the stator slot 4 is completed by a wedge-like cap 9 engaging in a respective grooved portion 10 of the stator yoke 3. The wedge-like cap 9 may be radially removed and put back in place.

As is discernible from FIG. 1, the duct-like pipe 7 is divided in four separate, symmetrically disposed, rectangular cooling channels 11. Thereby, the duct-like pipe 7 and the respective cooling channels 11 may be integrally built since the duct-like pipe 7 is preferably made of an aluminium profile.

Figure 2:
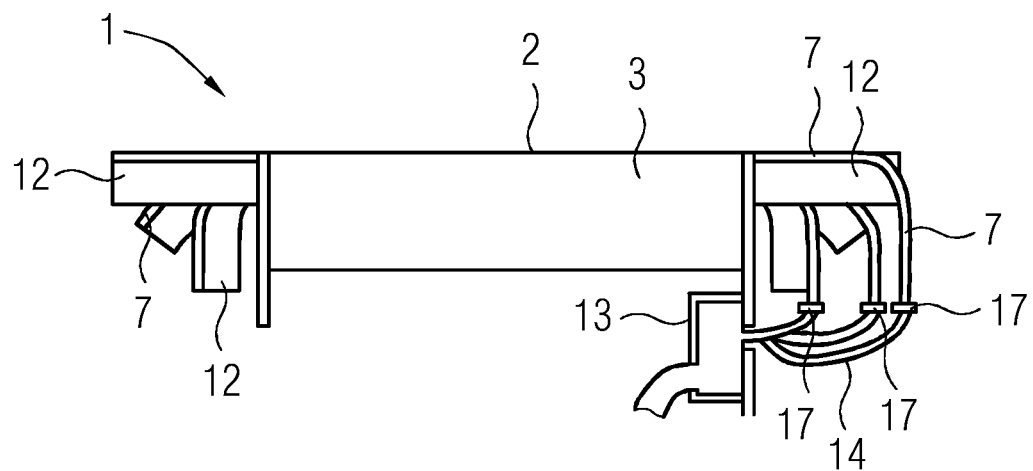
FIG. 2 shows the stator arrangement of FIG. 1 in a longitudinal cut view.

The top position of the duct-like pipe 7 within the stator slot 4 is preferred since in this case, the course of the duct-like pipe 7 may follow the course of the at least one set of stator windings 5 even throughout the regions of the end or overhang windings 12 (cf. FIG. 2). With the duct-like pipe 7 following the full length of the respective set of stator windings 5, the thermal hotspots usually located in the region of the end windings 12 are reduced.

The inventive multi-channel design of the duct-like pipe 7 comprising respective cooling channels 11 together with the aluminium profile allows tuning the mechanical properties of the inventive duct-like pipe 7 close to the mechanical properties of known duct-like pipes made of copper. Hence, it is feasible to use the same bending tools as for copper based duct-like pipes when shaping the inventive duct-like pipe 7 which gives rise to reduced manufacturing time and costs.

The installation of the inventive duct-like pipe 7 within the respective stator slot 4 is simple and fast since the set of stator windings 5 as well as the duct-like pipes 7 are installed within the insulation layer 8, the stator slot 4 is closed by the cap 9 and vacuum pressure is applied, i. e. the stator slot 4 is vacuum pressure impregnated. In such a manner, any gas layer between the duct-like pipe 7 and the set of stator windings 5 is removed in order to further enhance the cooling efficiency.

FIG. 2 shows the inventive stator arrangement 1 known from FIG. 1 in a longitudinal cut view. As has been mentioned, FIG. 2 shows that the duct-like pipe 7 entirely follows the course and orientation of the sets of stator windings 5 even in the region of the respective end windings 12, i. e. the duct-like pipe 7 exhibits the same bending radii as the end windings 12 leading to improved cooling capability due to an enhanced contact surface between the duct-like pipe 7 and the respective set of stator windings 5.

As is further discernible from FIG. 2, the inlet 15 and outlet 16 of the duct-like pipe 7 and/or the at least two cooling channels 11 is disposed on the same face side of the stator yoke 3 giving rise to an eased accessibility of the inlets 15 and/or outlets 16 respectively. Further, the duct-like pipe 7 is connected to a cooling manifold 13 by means of respective connections such as flexible hoses 14 for instance. Thereby, the connection of the respective hoses 14 and the inlets 15 and outlets 16 of the cooling means may be established by respective O-rings 17 or the like.

Figure 3:
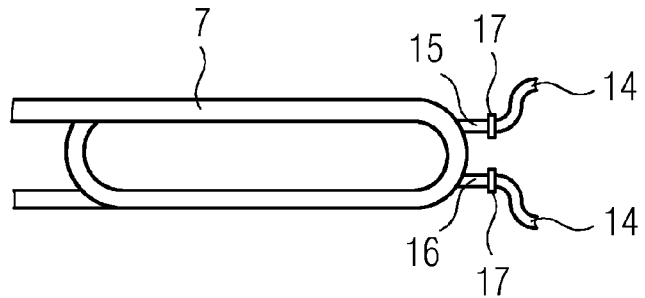
FIG. 3 shows a principle top view of a duct-like pipe according to an exemplary embodiment of the invention.

FIG. 3 shows a principle top-view of a duct-like pipe 7 according to an exemplary embodiment of the invention. FIG. 3 shows an exemplary geometrical, i. e. convoluted shape of the duct-like pipe 7 indicating the ability of realising respective bending radii of the duct-like pipe 7 in accordance with the respective bending radii of the stator windings 6. Besides, the duct-like pipe 7 is fast and easy connectable to the respective hoses 14 and further to the respective cooling manifold 13.

Figure 4:
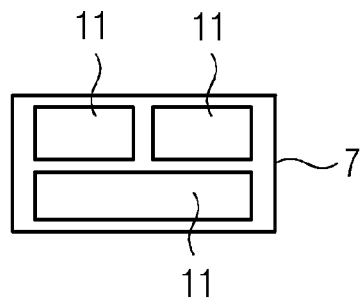
FIG. 4-FIG. 6 show principle cut views of duct-like pipes according to exemplary embodiments of the invention.
Figure 5:
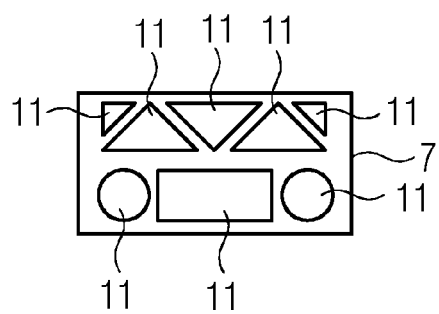
Figure 6:
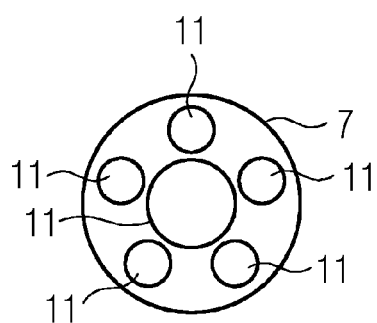

FIGS. 4-6 show principle cut views of duct-like pipes 7 according to exemplary embodiments of the invention. The embodiments shown in FIGS. 4-6 clearly depict the possibility of arbitrary shaping the duct-like pipe 7 as well as the cooling channels 11 with different cross-sections and/or sizes.

According to the embodiment shown in FIG. 4, both the duct-like pipe 7 and the respective cooling channels 11 comprise rectangular cross-sections. The cooling channels 11 are disposed into vertically aligned rows, whereby a first lower row comprises a first cooling channel extending over the almost entire length of the duct-like pipe 7, whereas the second row comprises two respective cooling channels 11 in a parallel alignment.

FIG. 5 shows an embodiment of a duct-like pipe 7 which also has a rectangular cross-section. The respective cooling channels 11 have diverse geometrical cross-sections, that is the respective cooling channels 11 disposed in the upper row comprise triangular cross-sections, whereas the respective cooling channels 11 disposed in the lower row comprise round or square cross-sections.

FIG. 6 shows a duct-like pipe 7 having a round cross-section. The respective cooling channels 11 also comprise round cross-sections, whereas the cross-sectional areas of the respective cooling channels 11 differ, i.e. the outer cooling channels 11 comprise a smaller cross-sectional area in comparison to the inner cooling channel 11.

Generally, it is preferred that the cross-sectional area of the respective duct-like pipe 7 is divided in respective cooling channels 11 to an utmost extent since this leads to an improved thermal exchange and hence, better cooling properties of the duct-like pipe 7.

As has been mentioned earlier, a non-conductive or low electrical conductivity coolant such as oil for instance runs through the respective cooling channels 11.

It is further possible that the stator 2 is segmented in at least two stator segments (not shown) being adapted to build the stator 2.

The invention claimed is:

1. A stator arrangement for an electric machine, comprising:
    a stator having a stator yoke with a plurality of stator slots, with each stator slot accommodating at least one set of stator windings, and
    at least one cooling device in the shape of a duct-like pipe, wherein the duct-like pipe is divided into a plurality of separate cooling channels,
    wherein the inlet and outlet of the duct-like pipe is disposed on the same axial face side of the stator yoke.

2. The stator arrangement according to claim 1, wherein each of the plurality of separate cooling channels has the same cross-sectional shape.

3. The stator arrangement according to claim 1, wherein the plurality of separate cooling channels are integrally formed in the duct-like pipe.

4. The stator arrangement according to claim 1, wherein the duct-like pipe is built of an aluminium profile.

5. The stator arrangement according to claim 1, wherein the plurality of separate cooling channels are symmetrically disposed with respect to a centre axis of the stator.

6. The stator arrangement according to claim 1, wherein the duct-like pipe and/or at least one of the plurality of separate cooling channels has a rectangular cross section.

7. The stator arrangement according to claim 1, wherein the duct-like pipe is connected to a cooling manifold.

8. The stator arrangement according to claim 1, wherein the course of the duct-like pipe at least partially follows the course of the at least one set of stator windings.

9. The stator arrangement according to claim 8, wherein the course of the duct-like pipe entirely follows the course of the at least one set of stator windings.

10. The stator arrangement according to claim 1, wherein the stator is segmented in at least two stator segments adapted to build the stator.

11. An electric machine, comprising a stator arrangement according to claim 1.

12. The electric machine of claim 11,
wherein the electric machine is generator for a wind turbine.

13. The stator arrangement according to claim 1,
wherein the plurality of separate cooling channels includes a first cooling channel and a second cooling channel and the first cooling channel has different cross-sectional shape than the second cooling channel.

14. The stator arrangement according to claim 1,
wherein each of the plurality of separate cooling channels has the same length.

15. The stator arrangement according to claim 1,
wherein the plurality of separate cooling channels includes a first cooling channel and a second cooling channel and the first cooling channel has different length than the second cooling channel.

16. The stator arrangement according to claim 1,
wherein each of the plurality of separate cooling channels has the cross sectional area.

17. The stator arrangement according to claim 1,
wherein the plurality of separate cooling channels includes a first cooling channel and a second cooling channel and the first cooling channel has different cross sectional area than the second cooling channel.

* * * * *